July 7, 1925.

W. A. TURBAYNE 1,545,174

DYNAMO ELECTRIC MACHINE

Original Filed July 20, 1915    6 Sheets-Sheet 1

Witnesses
B. H. Caldwell
Robt B Reinhard

Inventor
William A. Turbayne
By Raymond H. Van Nest
Attorney

July 7, 1925.

W. A. TURBAYNE 1,545,174

DYNAMO ELECTRIC MACHINE

Original Filed July 20, 1915    6 Sheets-Sheet 2

Witnesses
B. H. Caldwell
Robt B. Reinhard

Inventor
William A. Turbayne
By Raymond H. Van Nest
Attorney

July 7, 1925.

W. A. TURBAYNE 1,545,174

DYNAMO ELECTRIC MACHINE

Original Filed July 20, 1915   6 Sheets-Sheet 3

Witnesses
B. H. Caldwell
Robt B. Reinhard

Inventor
William A. Turbayne
By Raymond H. Van Nest
Attorney

July 7, 1925.  1,545,174
W. A. TURBAYNE
DYNAMO ELECTRIC MACHINE
Original Filed July 20, 1915   6 Sheets-Sheet 4

Inventor
William A. Turbayne
By Raymond H. Van Nest
Attorney

Witnesses
B. H. Caldwell
Robt B Reinhard

July 7, 1925.

W. A. TURBAYNE 1,545,174

DYNAMO ELECTRIC MACHINE

Original Filed July 20, 1915   6 Sheets-Sheet 5

Witnesses
B. H. Caldwell
Robt B Reinhard

Inventor
William A. Turbayne
By Raymond H. Van Nest
Attorney

July 7, 1925.

W. A. TURBAYNE

DYNAMO ELECTRIC MACHINE

Original Filed July 20, 1915    6 Sheets-Sheet 6

1,545,174

Inventor

William A. Turbayne

Witnesses

B. H. Caldwell
Robt B Reinhard

By Raymond H. Van Nest

Attorney

Patented July 7, 1925.

1,545,174

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

Application filed July 20, 1915, Serial No. 40,837. Renewed November 1, 1923.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

This invention relates to improvements in dynamo-electric machines.

More particularly the invention relates to a direct current dynamo-electric machine which combines in a single machine all of the functions and advantages of a motor-generator set and which is also capable of operation as a double circuit generator supplying currents of independent characteristics simultaneously to a plurality of circuits.

A motor-generator requires two dynamo-electric machines, one acting as a motor and the other as a generator. The motor is supplied with current from an external source and drives the generator, which may be independently regulated to deliver current of any desired value and at any voltage within the limits of capacity of the machine.

Attempts have been made heretofore to combine the functions of the motor and generator of a motor-generator set in a single direct current converter. In such machines, however, it has been impossible heretofore to obtain the same flexibility and range of regulation of output as may be obtained from the motor-generator. One machine has been proposed in which regulation of the output to a limited extent is obtained by distorting or shifting the field. This results in a variation of output, but only at the expense of efficiency. The field distortion necessarily affects the motor characteristics, and the weakened effect of the field causes dangerously high speeds. The range of variation of output is necessarily limited and it is impossible to obtain a wide variation or to obtain current values in either direction at will.

An object of the present invention is to provide a single dynamo-electric machine which may be driven from a direct current source and which will deliver a direct current which may be varied over wide ranges or reversed at will.

Another object of the invention is to provide a single dynamo-electric machine which may be driven from a direct current source and will, with equal efficiency, under all conditions, deliver a direct current which may be varied over a wide range or reversed at will.

Another object of the invention is to provide a double current generator which will deliver current simultaneously to a plurality of external circuits and in which the characteristics, value and direction of current delivered to each circuit may be varied at will.

According to this invention, the dynamo-electric machine is provided with two distinct sets of field windings on the same field structure, setting up magnetizing fields that are superimposed. One set of windings creates a bipolar field in which the magnetic poles are 180 degrees apart, while the other set of field windings superimpose on this 180 degree bipolar field a bipolar field in which the magnetic poles are 120 degrees apart. A single armature winding of substantially 120 degrees pitch, co-operates with these two fields. Two pairs of brushes, one pair arranged 180 degrees apart and the other pair 120 degrees apart, are connected to separate external circuits and are equally effective to absorb energy from an external source or to deliver current to the external circuit. Each field may be independently varied in strength and will exert its influence in proportion at the corresponding set of brushes independently of the effect of the other field. For the sake of simplicity, the invention will be described embodied in a machine having a pair of superimposed bipolar fields and a single armature winding having a predetermined relation to said fields. It will be understood, of course, that the number of fields may be multiplied as desired, so long as the electrical relations are maintained between armature and fields.

In order to explain the invention, a single embodiment has been chosen for description, and is illustrated diagrammatically in the accompanying drawings.

It is to be understood that the invention may also be embodied and carried out in various other ways to obtain the objects and advantages described.

The views in the accompanying drawings are as follows.

Figure 1:
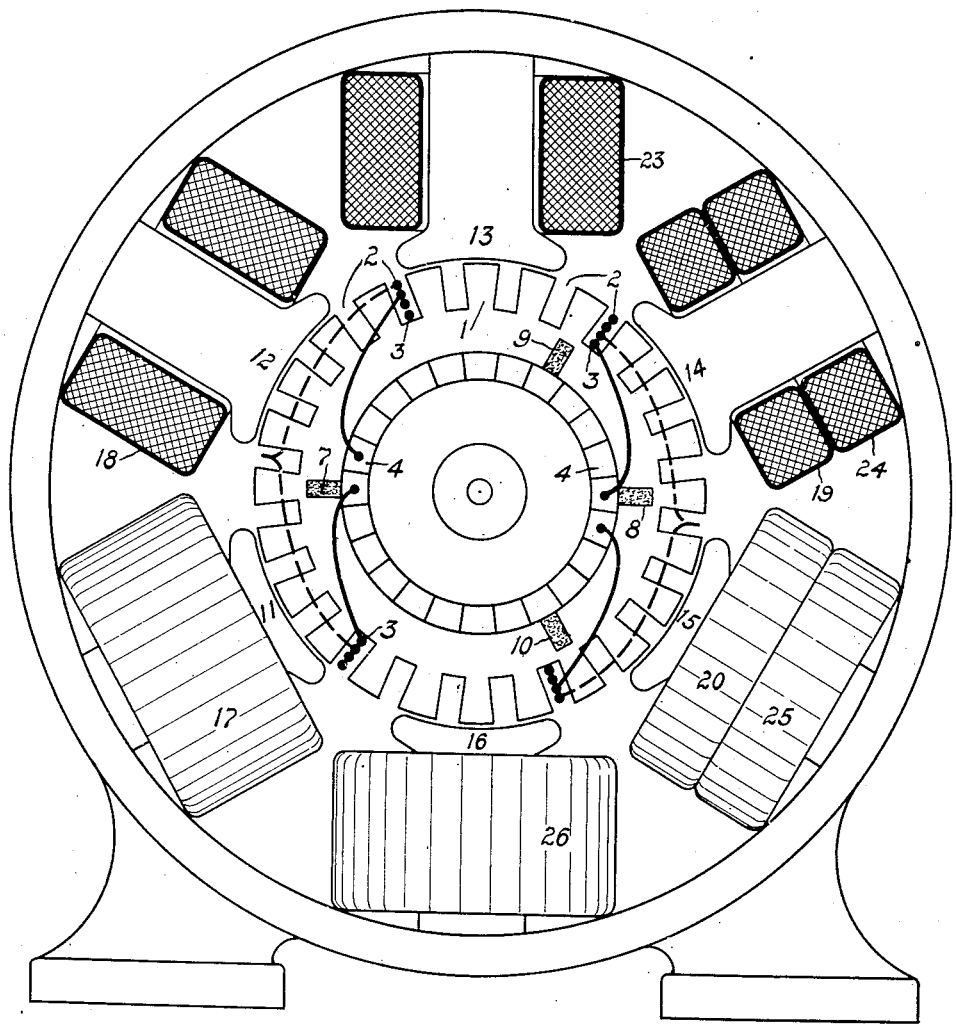
Figure 1 represents diagrammatically and partly in section, one embodiment of the improved dynamo-electric machine.
Figure 2:
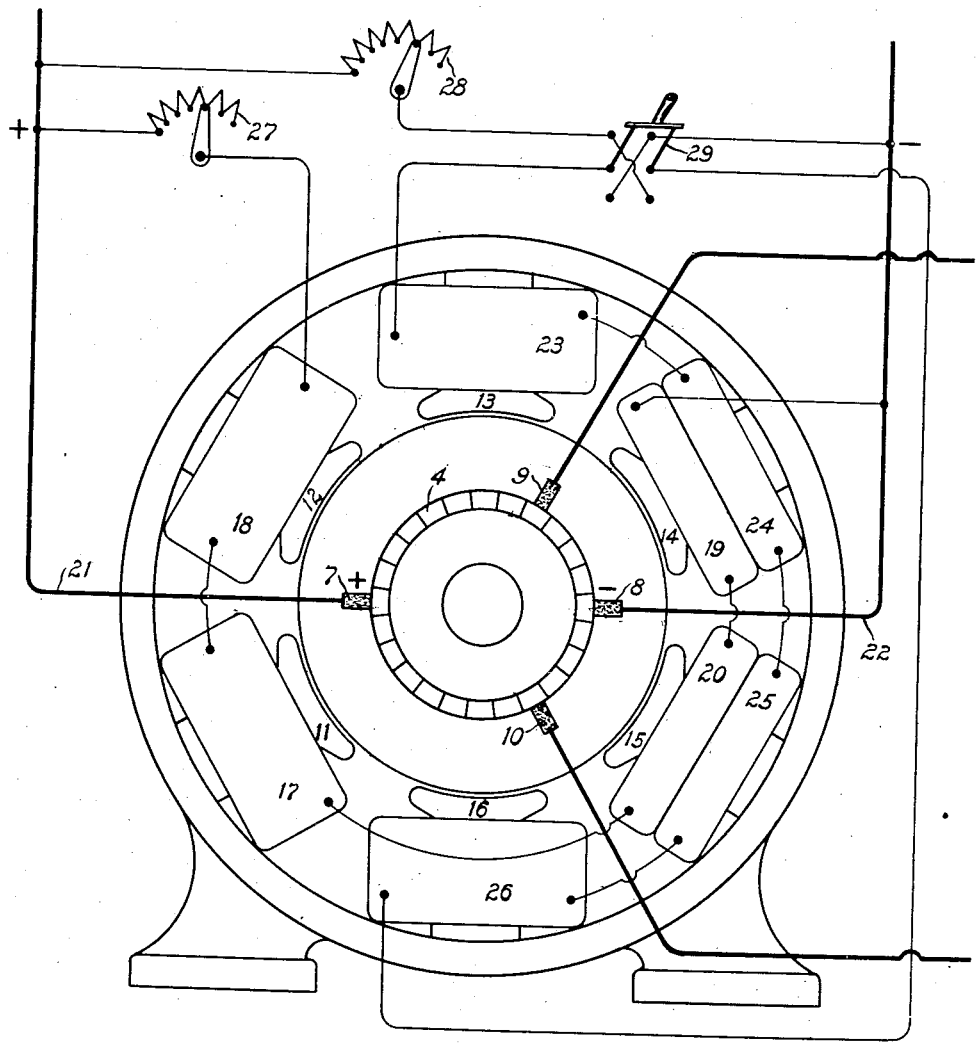
Figure 2 represents diagrammatically the dynamo-electric machine and its circuits.

The dynamo-electric machine has an armature 1 provided with slots 2, regularly distributed about its periphery. The slots carry armature conductors 3 arranged therein to form coils. These coils are given substantially 120 degrees pitch, that is, the upper and under conductors forming a coil are disposed in slots substantially 120 degrees apart. The ends of each coil are connected by symmetrically arranged conductors to adjacent commutator bars of the commutator 4. Figure 1 illustrates two such coils, but, of course, additional coils are distributed about the armature core in similar manner in each of the slots. The 120 degree pitch is selected, since such a winding is found, as hereinafter demonstrated, to be equally effective when driven in a bipolar field in which the opposite effective magnetic poles and brushes are arranged 180 degrees apart, or in which opposite poles and brushes are arranged 120 degrees apart. The proper brush arrangement for a winding arranged as above described, is in line with the axes of the effective magnetic poles of opposite polarity.

There are four brushes, 7, 8, 9 and 10, bearing on the commutator. Brushes 7 and 8 are arranged 180 degrees apart and brushes 9 and 10 are arranged 120 degrees apart, being disposed about 60 degrees on opposite sides of the brush 8.

The field has six poles, 11, 12, 13, 14, 15 and 16, symmetrically arranged. Poles 11, 12, 14 and 15 are provided with field coils 17, 18, 19 and 20 respectively, connected in series across the conductors 21 and 22 leading from the brushes 7 and 8. Poles 13, 14, 15 and 16 are provided with coils 23, 24, 25 and 26 respectively, also connected in series across conductors 21 and 22. Thus poles 11, 12, 13 and 16 each has a single winding, while poles 14 and 15 are provided each with two windings, one included in each set of windings. A field rheostat 27 is provided for adjusting the current strength in windings 17, 18, 19 and 20, and a field rheostat 28, for adjusting the current strength in windings 23, 24, 25 and 26. A pole changing switch 29 is also provided for reversing the direction of current in the last mentioned set of windings. The windings are so disposed on the field poles that upon the passage of exciting current therethrough, poles 11 and 12 will be of similar polarity, for example, south poles, while poles 14 and 15 will be of similar polarity, for example, north poles, so that with these poles so excited, there is in effect a symmetrical bipolar machine with magnetic flux passing along an axis in line with the center of the spaces between poles 11 and 12 and 14 and 15 respectively. Brushes 7 and 8 are disposed in line with this flux axis. Also the windings 23, 24, 25 and 26 are so disposed on the field poles that upon the passage of exciting current therethrough, poles 13 and 14 will be of one polarity, for example, north poles, while poles 15 and 16 will be of opposite polarity, for example, south poles. This provides in effect a bipolar structure with the mean axes disposed at an angle of 120 degrees and respectively in line with the spaces between poles 13, 14 and 15, 16. Brushes 9 and 10 are arranged in line with these axes. In either case, that is, with one or the other set of field poles alone energized, and with the field excited to produce equal flux densities with the armature driven at similar speeds, the armature winding will be equally effective in producing similar values of E. M. F. upon the respective brushes 7 and 8 or 9 and 10. This may be demonstrated by the diagrammatic representations and plan developments in Figs. 3 to 10 inclusive. In the diagrammatic representations such as Figure 3, the symbols on the armature conductors represent the direction of current, the crosses indicating that the current flows in a downward direction or away from the observer and the dots indicating that the current flows in an upward direction or toward the observer. On the plan development such as Figure 4, the direction of current in the armature conductors is indicated by the arrows.

Figure 3:
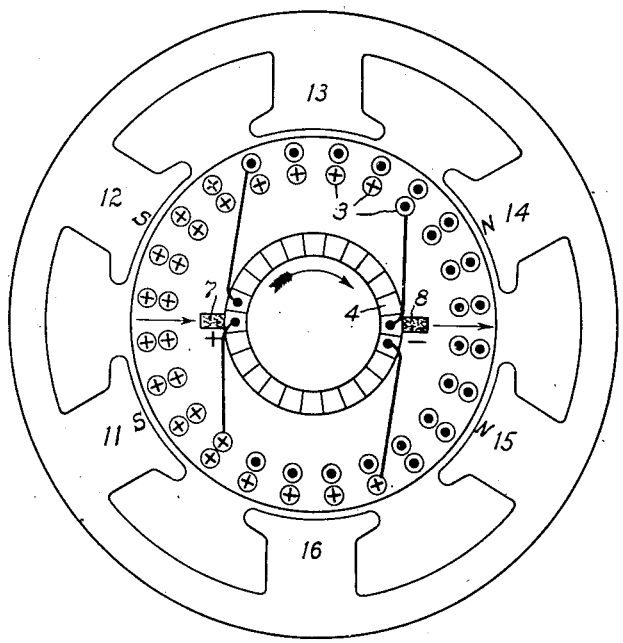
Figure 3 represents diagrammatically the armature circuits effective in motoring.
Figure 4:
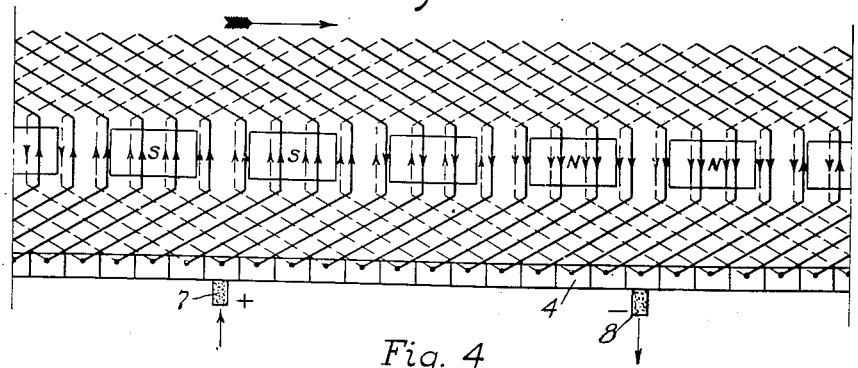
Figure 4 is a plan development of the same.

Figures 3 and 4 represent armature conditions when the field windings 17, 18, 19 and 20 are energized in such a direction that poles 11 and 12 are south poles and poles 14 and 15 are north poles. With the armature driven in a clock-wise direction, as indicated by the arrow, brush 7 will be a positive brush and brush 8 will be negative, and this relation will be true whether the machine is operating as a motor or a generator. In Figures 3 and 4, the direction of armature current is shown when the machine is operated as a motor. When the machine is operated as a generator, the direction of armature current will, of course, be reversed. It is apparent from these figures that all of the conductors under the exited poles are effective in carrying current to produce torque as a motor or in producing E. M. F. as a generator. The current in adjacent conductors under the unexcited poles flows in opposite directions and therefore, these conductors are ineffective.

Figure 5:
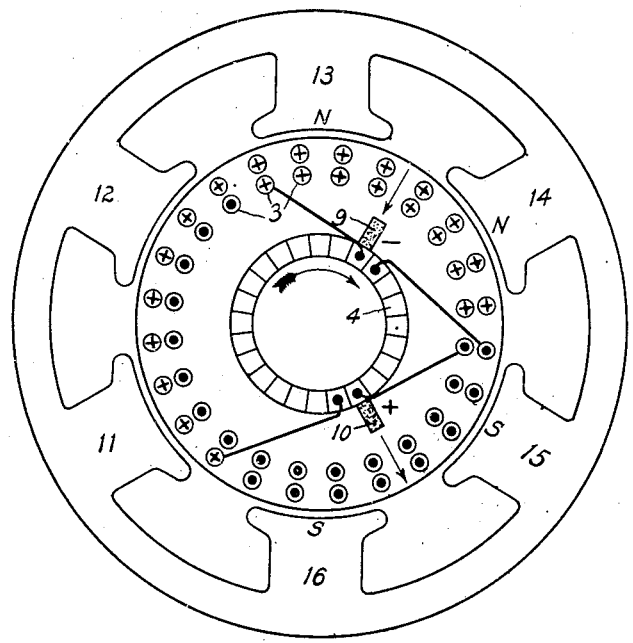
Figure 5 represents diagrammatically the armature circuits effective in generating.
Figure 6:
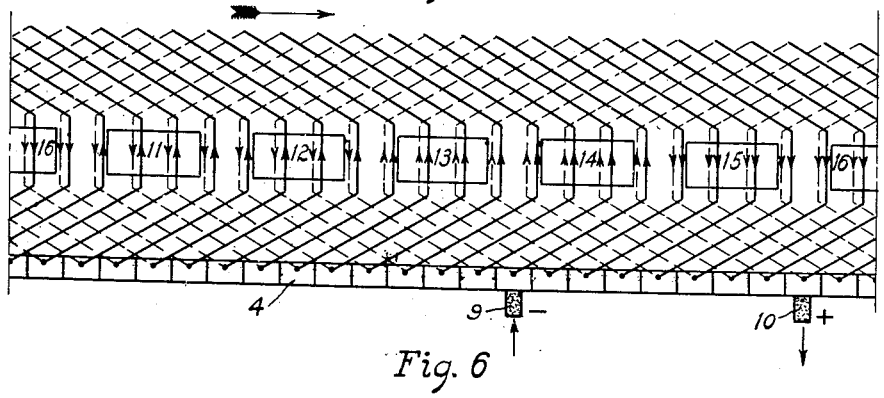
Figure 6 is a plan development of the same.

Figures 5 and 6 represent armature conditions when the field windings 23, 24, 25 and 26 alone are energized in such a direction that the poles 13 and 14 are north poles, while poles 15 and 16 are south poles, the mean axes of these poles being at an angle of substantially 120 degrees and each being displaced 60 degrees from the line connecting brushes 7 and 8. With the armature driven in a clock-wise direction, brush 10, opposite the center line of the south poles, will be positive, while brush 9, opposite the center line of the north poles, will be negative. In these figures the directions of current in the armature conductors are indicated when the machine is operating as a generator. When the machine is operating as a motor, the direction of armature current will, of course, be reversed. It is apparent from these figures that conditions in the armature exist similar to the conditions which exist in Figures 3 and 4. That is, all of the conductors under the excited poles are effective, while the conductors under the unexcited poles 11 and 12 are ineffective to produce torque as a motor or in producing E. M. F. as a generator, since current in adjacent conductors under these unexcited poles flows in opposite directions and therefore, exerts effects which neutralize or cancel.

It is evident, therefore, that the armature conductors are equally effective in producing E. M. F. in generating or torque in motoring, whether operating in a bipolar field of 180 degrees pitch or in a bipolar field of 120 degrees pitch.

Figure 7:
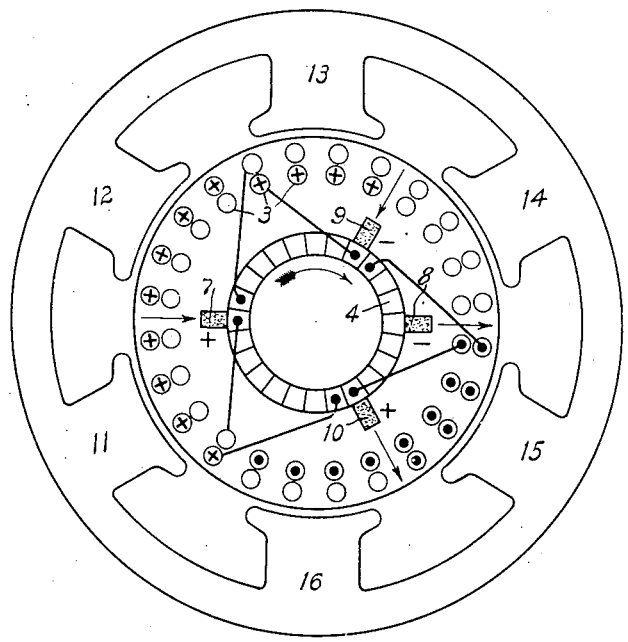
Figure 7 represents diagrammatically the armature circuits effective when the machine is acting both as a motor and a generator.
Figure 8:
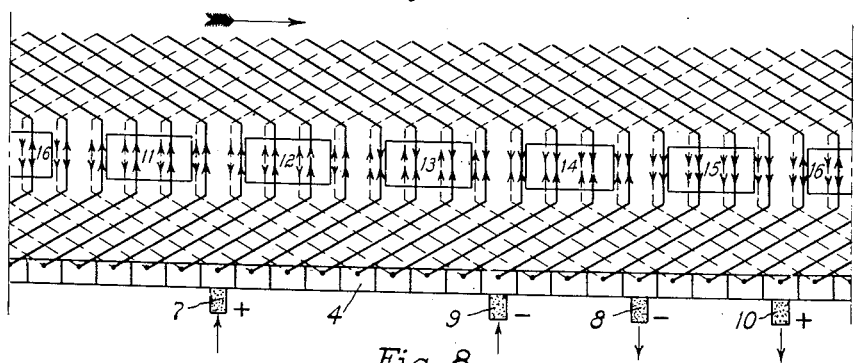
Figure 8 is a plan development of the same.

Figures 7 and 8 represent armature conditions when all six of the poles are excited. When this condition exists, that is, when the 180 degree bipolar field is superimposed upon the 120 degree bipolar field, each set of brushes 7 and 8 and 9 and 10 may be utilized to supply separate circuits, and each circuit may be made equally effective to either receive current for operating the machine as a motor or delivering current as a generator. It will noted that the axes of the two fields cross substantially to form the Greek letter psi. The machine will operate as a double circuit generator when the armature is driven by an external source of power, the current to one circuit being supplied by brushes 7 and 8 and the current to another circuit being supplied by brushes 9 and 10. The machine may be operated to perform the functions of a motor-generator or converter by admitting current through one set of brushes, for example, brushes 7 and 8, while brushes 9 and 10 deliver current to the external circuit. In Figures 7 and 8 it is assumed that current is admitted through brushes 7 and 8, and with the field poles excited as indicated, the machine will rotate in a clock-wise direction as a motor. Current will be delivered to an external circuit through brushes 9 and 10. The armature windings related to brushes 7 and 8 and the horizontally disposed poles 11, 12 and 14, 15, will perform the functions of a driving motor, while the armature windings related to brushes 9 and 10, and the angularly displaced poles 13, 14, and 15, 16 will perform the functions of a generator. The E. M. F. effective at brushes 9 and 10 may be varied at will by varying or reversing the excitation of poles 13, 14 and 15, 16. Thus, the current delivered by these brushes may be controlled or reversed at will without in any wise affecting the motor functions or the direction of rotation. In Figure 8 the upper arrows indicate the direction of current in the armature admitted through brushes 7 and 8, while the lower arrows indicate the direction of current supplied to the external circuit through brushes 9 and 10. As indicated on this figure, certain of the armature conductors carry the sum of the current supplied to the armature and that supplied by the armature, while other conductors carry only the difference between these currents. In Fig. 7, the conductors shown in blank indicate those which carry the difference between the currents.

Figure 9:
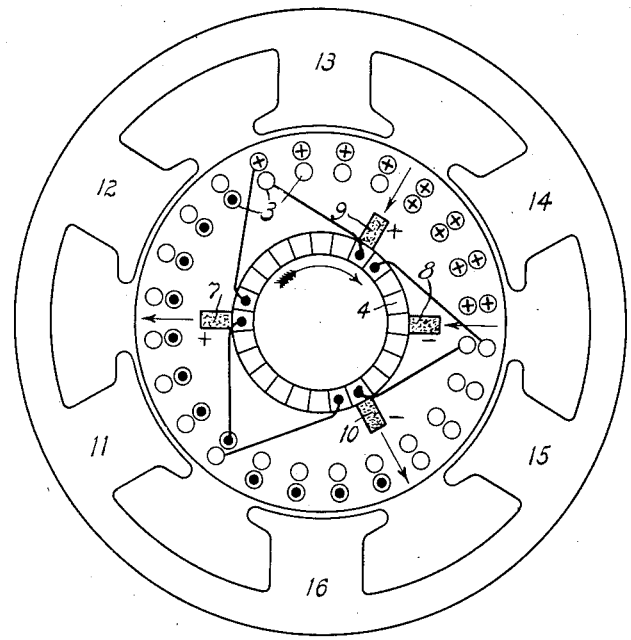
Figure 9 represents diagrammatically the armature circuits effective when the machine is acting as a double current generator.
Figure 10:
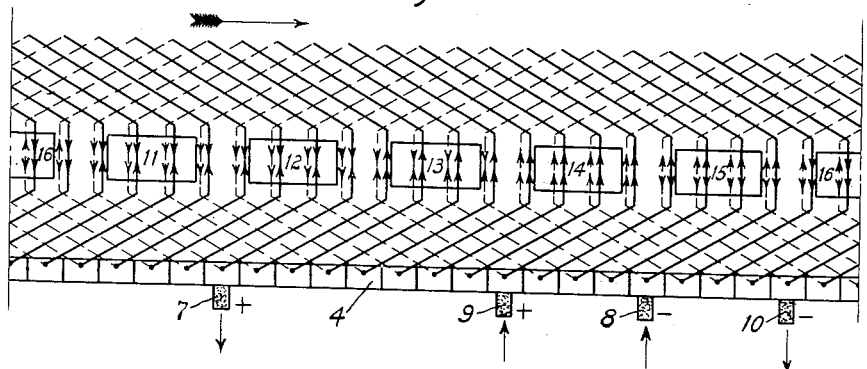
Figure 10 is a plan development of the same.

Figures 9 and 10 represent armature conditions when the motor is operating as a double circuit generator, that is, when the machine is driven by external power and both sets of brushes are used to deliver current to independent external circuits. Under these conditions, one-half of the armature conductors carry the sum of the currents delivered from both sets of brushes, while the other armature conductors carry their difference. In Fig. 9, as in Fig. 7, the conductors shown in blank indicate those conductors which carry the difference between the currents.

By manipulation of the rheostats 27 and 28, the machine may operate as a multi-circuit generator in which the current delivered to each circuit may be held at any desired value, within the range of the machine, regardless of the current being delivered to the other circuit. Furthermore, one set of field windings, co-operating with the appropriate armature conductors, may cause the machine to operate as a motor, and at the same time, current of any desired value, within the capacity of the machine, may be delivered from the brushes co-operating with the other set of field windings and appropriate armature conductors. By manipulation of said rheostats and the reversing switch 29, the value and direction of the delivered current may be held constant or varied, as desired.

Regulation of the field circuits may be provided by manual means, as indicated diagrammatically, or by any desirable automatic means. The means illustrated are merely typical and represent any preferred regulator. If desired, proper regulation may be provided inherently from the machine without external regulating means.

Variations in the arrangement or structure herein described may be made without departing from the invention as defined in the appended claims.

What I claim as new and desire to secure by Letters Patent of the United States is:—

1. A dynamo-electric machine having a single armature, a field structure having a plurality of poles, means for energizing said poles to set up a field of substantially $n$ degrees, means for simultaneously setting up a field of substantially $\frac{2n}{3}$ degrees superimposed on said $n$ degree field, said armature having a pitch of $\frac{2n}{3}$ degrees, independent sets of brushes co-operating with said armature and fields and means whereby current delivered to or from one set of brushes may be varied at will without varying the current to or from the other set of brushes.

2. A dynamo-electric machine having a single armature field poles energized to set up superimposed fields of substantially $\frac{2n}{3}$ degrees and $n$ degrees respectively, separate sets of brushes co-operating with said armature and said fields, and means for varying the strength and direction of one of said fields independently of the other, whereby the characteristics of the current delivered by one set of brushes may be varied without varying the functions performed by the armature co-operating with the other field.

3. A dynamo-electric machine having a single armature winding of substantially 120 degree electrical pitch, a plurality of field poles associated therewith, means for energizing said field poles to set up a bipolar field crossing said armature winding along axes spaced substantially 180 electrical degrees apart, a pair of brushes displaced 180 electrical degrees from each other, means for setting up a second bipolar field crossing said armature winding along axes spaced substantially 120 electrical degrees apart, said fields being superimposed and certain of the field poles being common to both fields, and a second pair of brushes displaced 120 electrical degrees from each other.

4. A dynamo-electric machine having a single armature winding of substantially 120 electrical degree pitch, a plurality of field poles associated therewith, means for energizing said field poles to set up a bipolar field crossing said armature winding along axes spaced substantially 180 electrical degrees apart, a pair of brushes displaced 180 electrical degrees from each other, means for setting up a second bipolar field crossing said armature winding along axes spaced substantially 120 electrical degrees apart, said fields being superimposed and certain of the field poles being common to both fields, a second pair of brushes displaced 120 electrical degrees from each other.

5. A dynamo-electric machine adapted for use as a direct current converter having a single armature and a plurality of field poles adapted to be energized to set up superposed bipolar fields of flux, one of said fields of flux threading said armature along axes spaced substantially 180 electrical degrees apart, the other of said fields of flux threading said armature along radii spaced substantially 120 electrical degrees apart, said radii being symmetrically located relative to said first mentioned field of flux, said armature being provided with windings of substantially 120 electrical degree pitch, a pair of diametrically opposed brushes adapted to supply current to said armature for motoring purposes, and a second pair of brushes adapted to supply an outside circuit.

6. A dynamo-electric machine having a single armature and means for producing two independent fields therefor, said fields being superimposed and symmetrically arranged, one of said fields crossing said armature along axes spaced substantially 180 electrical degrees apart and the other of said fields being arranged along radial axes spaced substantially 60 electrical degrees on either side of the other field, said armature being provided with a winding of substantially 120 electrical degree pitch, a pair of brushes for said armature, and a second pair of brushes, each of which is located substantially 120 degrees from one of said first pair of brushes.

7. A dynamo-electric machine having a single armature, field coils for setting up a bipolar field threading said armature along axes spaced substantially $n$ degrees apart, and a superimposed bipolar field threading said armature along radial axes spaced $\frac{n}{3}$ degrees from said first mentioned path, two pairs of brushes co-operating with said fields, one set being operative to receive current while the other set is operative at the same time to deliver current.

8. A dynamo-electric machine having a single armature, field coils for setting up a bipolar field threading said armature along axes spaced substantially $n$ degrees apart, and a superposed bipolar field threading said armature along radial axes spaced $\frac{n}{3}$ degrees from said first mentioned path, two pairs of brushes co-operating with said fields, one set being operative to receive current while the other set is operative at the same time to deliver current, said armature being provided with a winding of substantially 120 electrical degree pitch, relative to said first mentioned field.

9. A dynamo-electric machine having a single armature, field coils for setting up a bipolar field threading said armature along axes spaced substantially $n$ degrees apart and a superimposed bipolar field threading said armature along radial axes spaced substantially $\frac{n}{3}$ electrical degrees on either side of said first mentioned path, two pairs of brushes co-operating with said fields, one set being operative to receive current, while the other set is operative at the same time to deliver current, and means for varying or reversing one of said fields.

10. A dynamo-electric machine having a single armature, field coils for setting up a bipolar field threading said armature along axes spaced substantially 180 electrical degrees apart, and a superposed bipolar field threading said armature along radial axes spaced substantially 60 electrical degrees on either side of said first mentioned path, two pairs of brushes co-operating with said fields, one pair being operative to receive current while the other pair is operative at the same time to deliver current, one pair of brushes being spaced substantially 180 electrical degrees apart and the other pair being spaced substantially 120 electrical degrees apart.

11. A dynamo-electric machine having a single armature, field coils for setting up a bipolar field threading said armature along axes spaced substantially 180 electrical degrees apart, and a superposed bipolar field threading said armature along radial axes spaced substantially 60 electrical degrees on either side of said first mentioned path, two sets of brushes co-operating with said fields, one set being operative to receive current, while the other set is operative at the same time to deliver current, said armature being provided with a winding of substantially 120 electrical degree pitch, one set of brushes being spaced substantially 180 electrical degrees apart and the other set being spaced substantially 120 electrical degrees apart.

12. A dynamo-electric machine having a single armature winding, a plurality of field poles associated therewith, means for energizing said field poles to set up a field crossing said armature winding along axes spaced $n$ degrees apart, a pair of brushes spaced $n$ degrees apart, means for setting up a second field crossing said armature winding along axes spaced substantially $\frac{2n}{3}$ degrees apart, said fields being superimposed and certain of the field poles being common to both fields, and a second pair of brushes spaced $\frac{2n}{3}$ degrees apart, said armature winding having a pitch of substantially $\frac{2n}{3}$ degrees.

13. A dynamo-electric machine adapted for use as a direct current converter having a single armature and a plurality of field poles adapted to be energized to set up distinct superposed bipolar fields of flux, one of said fields of flux threading said armature along axes spaced substantially $n$ degrees apart, the other of said fields of flux threading said armature along radii spaced substantially $\frac{2n}{3}$ degrees apart, said radii being symmetrically located relative to said first mentioned field of flux, said armature being provided with windings of substantially 120 electrical degree pitch relative to said first mentioned field, a pair of diametrically opposed brushes adapted to supply current to said armature for motoring purposes, and a second pair of brushes adapted to supply an outside circuit.

14. A dynamo-electric machine having a single armature and means for producing two independent fields therefor, said fields being superimposed and symmetrically arranged, one of said fields crossing said armature along axes spaced substantially $n$ degrees apart and the other of said fields being arranged along radial axes spaced substantially $\frac{n}{3}$ degrees on either side of the other field, said armature being provided with a winding of substantially 120 electrical degree pitch relative to said first field, a pair of brushes for said armature, and a second pair of brushes, each of which is located substantially 120 degrees from one of said first pair of brushes.

15. A dynamo-electric machine having a single armature, field coils for setting up a bipolar field threading said armature along axes spaced substantially $n$ degrees apart, and a superposed bipolar field threading said armature along radial axes spaced substantially $\frac{n}{3}$ degrees on either side of said first mentioned path, two pairs of brushes co-operating with said fields, one pair being operative to receive current while the other pair is operative at the same time to deliver current, one pair of brushes being spaced substantially $n$ degrees apart and the other pair being spaced substantially $\frac{2n}{3}$ degrees apart.

16. A dynamo-electric machine having a single armature, field coils for setting up a bipolar field threading said armature along axes spaced substantially $n$ degrees apart, and a superposed bipolar field threading said armature along radial axes spaced substantially $\frac{n}{3}$ degrees on either side of said first mentioned path, two sets of brushes co-operating with said fields, one set being operative to receive current, while the other set is operative at the same time to deliver current, said armature being provided with a winding of substantially 120 electrical degree pitch relative to said first mentioned field, one set of brushes being spaced substantially $n$ degrees apart and the other set being spaced substantially $\frac{2n}{3}$ degrees apart.

17. In a dynamo-electric machine, a field structure having polar means, coil means for magnetizing said polar means a pair of polar projections spaced 180 electrical degrees from said polar means, coil means for magnetizing said polar projections oppositely to said first mentioned means, other polar projections each provided with coil means to magnetize same oppositely to each other, said last mentioned polar projections being spaced on either side of said polar means between said polar means and said first mentioned polar projections, each of said first mentioned polar projections having other coil means for setting up a magnetizing effect similar in sense to the adjacent mentioned polar projection.

18. In a dynamo-electric machine, a field structure having polar means, coil means for magnetizing said polar means, a pair of polar projections spaced 180 electrical degrees from said polar means, coil means for magnetizing said polar projections oppositely to said first mentioned means, other polar projections each provided with coil means to magnetize same oppositely to each other, said last mentioned polar projections being spaced on either side of said polar means between said polar means and said first mentioned polar projections, each of said first mentioned polar projections having other coil means for setting up a magnetizing effect similar in sense to the adjacent second mentioned polar projection, an armature co-operating with said field structure having a 120 electrical degree pitch and a pair of brushes commutating conductors between said polar means and said second mentioned polar projections and between said second mentioned polar projections and said first mentioned polar projections, and a second pair of brushes each of which commutates a conductor lying between said first mentioned polar projections and a conductor lying between said polar means and said second mentioned polar projections.

In witness whereof, I have hereunto subscribed my name.

WILLIAM A. TURBAYNE.